UNITED STATES PATENT OFFICE.

ASAHEL K. EATON, OF KINGS COUNTY, NEW YORK.

IMPROVEMENT IN VULCANIZING CAOUTCHOUC.

Specification forming part of Letters Patent No. 27,706, dated April 3, 1860.

*To all whom it may concern:*

Be it known that I, ASAHEL K. EATON, of the county of Kings and State of New York, have invented a new and Improved Method of Applying Heat in the Casing of India-Rubber or Gutta-Percha Compounds, of which the following is a full and exact description.

In the ordinary method of vulcanization heat is applied in close vessels by means of steam or hot air.

The nature of my invention consists in the use of saline solutions, the boiling-points of which may be made to range, by means of the greater or less concentration of the same, through the different degrees of temperature required in the vulcanization, (from 220° to 250°, 280°, and in some cases to over 300°,) the solution being used in an open vessel. Of a large number of salts that may be used for this purpose, I have found the tartrate of potash and soda, nitrate of soda, acetate of soda, and the chloride of calcium best adapted to the process. Chloride of calcium is the best of these. A solution of this salt may be worked at a temperature of over 300° Fahrenheit, and therefore is adapted to the vulcanization of all compounds, whether they require a high or low heat.

The bath should be prepared by dissolving the salt in such an amount of water that its boiling-point shall be at the temperature required during the first part of the curing process. The continued heat will by evaporation gradually raise the boiling-point to its maximum, and, as there can be no elevation of temperature except as the boiling-point is raised, the saline solution itself regulates the increase of heat. There can be no sudden elevation of temperature.

The articles to be cured are put up in molds or otherwise, as in the ordinary method of vulcanization, and immersed in the saline bath for from three to six hours, the temperature ranging from 220° Fahrenheit to 280° Fahrenheit, or even to 300° Fahrenheit, as the character of the article may require. For the vulcanization of soft gum a temperature not higher than 280° is sufficient; for hard, a temperature of 300°, and even 310°, is used.

As an improvement upon the ordinary methods of vulcanizing in closed receptacles by means of steam or hot air, the superiority of this process is obvious. The vessel is open and the progress of the curing process can be noted at any time. The temperature cannot be so hastily raised as to endanger decomposition. The heat is perfectly uniform and the simplest apparatus can be used—any ordinary vessel over a common fire.

I am aware that heated saline solutions have been and are used in many instances in the arts as a means of applying heat; but this broad use forms no part of my invention; nor do I claim the immersion of simple caoutchouc in such solution; but What I do claim, and desire to secure by Letters Patent, as my invention is—

The new method of applying heat to india-rubber or allied gums, when the same are ready for being vulcanized, by the employment of a saline bath, as herein set forth.

ASAHEL K. EATON.

Witnesses:
 JONATHAN EDWARDS,
 G. GAY.